(12) United States Patent
Kneuper et al.

(10) Patent No.: US 9,555,896 B2
(45) Date of Patent: Jan. 31, 2017

(54) AIRCRAFT FLIGHT CONTROL

(71) Applicant: Cessna Aircraft Company, Wichita, KS (US)

(72) Inventors: Jeremy Joseph Kneuper, Hesston, KS (US); John Robert Lanier, Wichita, KS (US); Jason Michael Decker, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 125 days.

(21) Appl. No.: 14/643,542

(22) Filed: Mar. 10, 2015

(65) Prior Publication Data

US 2016/0176541 A1 Jun. 23, 2016

Related U.S. Application Data

(63) Continuation-in-part of application No. 14/642,256, filed on Mar. 9, 2015.
(Continued)

(51) Int. Cl.
*B64D 45/00* (2006.01)
*B64C 5/10* (2006.01)
(Continued)

(52) U.S. Cl.
CPC .............. *B64D 45/0005* (2013.01); *B64C 5/10* (2013.01); *B64D 43/00* (2013.01); *G01C 23/00* (2013.01);
(Continued)

(58) Field of Classification Search
CPC ............... B64D 45/00; B64C 5/10; G06F 3/00
(Continued)

(56) References Cited

U.S. PATENT DOCUMENTS 5,272,652 A 12/1993 Rosenshein et al.
6,559,769 B2 5/2003 Anthony et al.
(Continued)

OTHER PUBLICATIONS

International Search Report and Written Opinion issued in PCT/US2015/019437, Jun. 18, 2015, 14 pages.
(Continued)

*Primary Examiner* — Tan Q Nguyen
(74) *Attorney, Agent, or Firm* — Erise IP, P.A.

(57) ABSTRACT

The invention described herein provides a flight crew with an easier and more intuitive way to control and monitor flight-control surfaces. Specifically, the invention displays all flight-control surfaces on a touch-screen display device located in an aircraft cockpit. The invention includes graphical and numerical position indicators to continuously display actual position information for flight-control surfaces. Additionally, the invention allows a flight crew to make flight-control surface adjustments through the touch-screen device. The invention further includes an engine performance indicator and a mode controller configured to display autopilot modes and to receive autopilot mode selections. A method is presented for controlling an aircraft flight-control surface via a touch screen device. The method includes receiving an indication of a flight-control surface and enabling selection of a position change. Based on the position change selection, the method includes verifying a corresponding movement and displaying an actual position of the flight-control surface.

20 Claims, 9 Drawing Sheets

Related U.S. Application Data (60) Provisional application No. 61/951,189, filed on Mar. 11, 2014, provisional application No. 61/951,260, filed on Mar. 11, 2014, provisional application No. 61/951,231, filed on Mar. 11, 2014, provisional application No. 61/951,240, filed on Mar. 11, 2014, provisional application No. 61/951,243, filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014, provisional application No. 61/951,145, filed on Mar. 11, 2014.

(51) Int. Cl.
*B64D 43/00* (2006.01)
*G01C 23/00* (2006.01)
*G08G 5/00* (2006.01)
*G08G 5/02* (2006.01)
*G07C 5/08* (2006.01)

(52) U.S. Cl.
CPC .......... *G08G 5/0021* (2013.01); *G08G 5/0034* (2013.01); *G08G 5/0052* (2013.01); *G08G 5/0078* (2013.01); *G08G 5/0091* (2013.01); *G08G 5/025* (2013.01); *G08G 5/0065* (2013.01)

(58) Field of Classification Search
USPC .......................... 701/3, 4, 14, 29.7; 715/700
See application file for complete search history.

(56) References Cited

U.S. PATENT DOCUMENTS

| | | |
|---|---|---|
| 6,672,535 B2 | 1/2004 | Brunner, Jr. et al. |
| 6,873,261 B2 | 3/2005 | Anthony et al. |
| 7,142,131 B2 | 11/2006 | Sikora |
| 7,148,814 B2 | 12/2006 | Sikora et al. |
| 7,467,030 B2* | 12/2008 | Artini ................. G01C 23/00 340/945 |
| 8,633,913 B1 | 1/2014 | Raghu et al. |
| 2001/0035832 A1 | 11/2001 | Block |
| 2003/0156046 A1 | 8/2003 | Dwyer |
| 2004/0140959 A1 | 7/2004 | Matsumura et al. |
| 2004/0236481 A1 | 11/2004 | Saint-Aroman et al. |
| 2005/0178903 A1* | 8/2005 | Boorman ............... G01D 7/00 244/118.5 |
| 2009/0112380 A1 | 4/2009 | Nutaro et al. |
| 2010/0052949 A1* | 3/2010 | Suddreth ............ G08G 5/0021 340/995.19 |
| 2010/0141482 A1 | 6/2010 | Wyatt et al. |
| 2010/0185344 A1 | 7/2010 | Roach |
| 2010/0194602 A1 | 8/2010 | Engels et al. |
| 2010/0211237 A1 | 8/2010 | Nichols et al. |
| 2010/0231418 A1 | 9/2010 | Whitlow et al. |
| 2010/0250030 A1 | 9/2010 | Nichols et al. |
| 2011/0193694 A1 | 8/2011 | Bowden et al. |
| 2011/0241901 A1 | 10/2011 | Firra |
| 2012/0026190 A1 | 2/2012 | He et al. |
| 2013/0076540 A1 | 3/2013 | McLoughlin et al. |
| 2013/0162632 A1 | 6/2013 | Varga et al. |
| 2013/0245860 A1 | 9/2013 | Cooper |
| 2014/0008496 A1 | 1/2014 | Ye et al. |
| 2014/0057678 A1 | 2/2014 | Krupnik |
| 2014/0285661 A1 | 9/2014 | Feyereisen et al. |
| 2015/0262545 A1 | 9/2015 | Kneuper et al. |
| 2015/0352952 A1 | 12/2015 | Kneuper et al. |

OTHER PUBLICATIONS

U.S. Appl. No. 14/643,510, Office Action dated Feb. 18, 2016, 24 pages.

* cited by examiner

AIRCRAFT FLIGHT CONTROL

CROSS-REFERENCE TO RELATED APPLICATIONS

This application is a continuation-in-part of U.S. patent application Ser. No. 14/642,256, entitled "Touch Screen Instrument Panel", filed Mar. 9, 2015, which claims the benefit of each of U.S. Provisional Application No. 61/951, 145, entitled "3D Weather", U.S. Provisional Application No. 61/951,189, entitled "HD Camera", U.S. Provisional Application No. 61/951,260, entitled "Adjustable Synthetic Vision System", U.S. Provisional Application No. 61/951, 231, entitled "Skytrak Navigational Aid", U.S. Provisional Application No. 61/951,240, entitled "Smart Airport Application", U.S. Provisional Application No. 61/951,243, entitled "Smart Traffic Application", U.S. Provisional Application No. 61/951,157, entitled "Chart Synoptic Window", U.S. Provisional Application No. 61/951,168 entitled "Flight Planning Synoptic Window", U.S. Provisional Application No. 61/951,201 entitled "Intelligent Radio Frequency Identifiers", U.S. Provisional Application No. 61/951,152, entitled "Crew Alerting System", U.S. Provisional Application No. 61/951,195 entitled "Historical Data Feature", U.S. Provisional Application No. 61/951,208 entitled "Maintenance Synoptic Window", U.S. Provisional Application No. 61/951,220 entitled "Master Warning/Master Caution", U.S. Provisional Application No. 61/951,234 entitled "Proximity Icon", U.S. Provisional Application No. 61/951,166 entitled "Flight Control Synoptic Window", U.S. Provisional Application No. 61/951,215 entitled "Mode Controller and Engine Indication Icon", U.S. Provisional Application No. 61/951,253 entitled "Synoptic Window Layout", U.S. Provisional Application No. 61/951,216 entitled "Moveable Synoptic Pages", U.S. Provisional Application No. 61/951,223 entitled "Pinnable Synoptic Pages", all filed Mar. 11, 2014. The entireties of each of the aforementioned applications are incorporated by reference herein.

BACKGROUND OF THE INVENTION

The invention relates generally to the field of aircraft. More specifically, the invention relates to the field of instrument panels for aircraft.

Historically, avionics suppliers have displayed flight-control surface states on the Main Flight Display (MFD) and/or monuments located, typically, in the pedestal (such as the flap controller and rudder controller).

Previously, the mode controller was a separate piece of equipment mounted in the instrument panel. The engine indications were part of the Main Flight Display (MFD) for newer aircraft, or steam gauges for older aircraft.

SUMMARY

In one embodiment, a flight-control system for navigation of an aircraft is provided. The system includes a storage component having one or more instructions stored thereon, a touch screen display device, a processor coupled to the display device and a memory. The processor is configured to execute the one or more instructions stored in the storage component. The system further includes a manager configured to provide flight-control surface representations via the touch screen display device in an aircraft cockpit. The manager includes a graphical image of the aircraft for displaying flight-control surface representations and one or more position indicators for indicating one or more positions of the aircraft flight-control surfaces. The graphical image and the position indicators are configured to receive indications for controlling positions of the aircraft flight-control surfaces and to display actual aircraft flight-control surface positions.

In another embodiment, a flight-control system for navigation of an aircraft is provided. The system includes a storage component having one or more instructions stored thereon, a touch screen display device, a processor coupled to the display device and a memory. The processor is configured to execute the one or more instructions stored in the storage component. The system further includes a manager configured to provide autopilot controls and engine indicators via the touch screen display device in an aircraft cockpit. The manager includes a cross-sectional representation of the aircraft fuselage for displaying a mode controller. The mode controller is configured to display autopilot modes and to receive autopilot mode selections. The cross-sectional representation further includes one or more engine cowls attached to the fuselage for displaying performance indicators for the one or more engines.

In yet another embodiment, a method for controlling an aircraft flight-control surface via a touch screen device is presented. The method includes presenting a list of menu options on a touch screen mounted in an aircraft cockpit, said list including a flight-control function. The method further includes receiving a selection of the flight-control function. Upon selection of the flight-control function, the method includes receiving an indication of a flight-control surface to control. Upon identifying the flight-control surface, the method includes enabling selection of a position change. Based on the position change selection, the method includes verifying a corresponding movement of the flight-control surface to the selected position and displaying an actual position of the flight-control surface on the touch screen device.

DETAILED DESCRIPTION OF THE INVENTION

Figure 1:
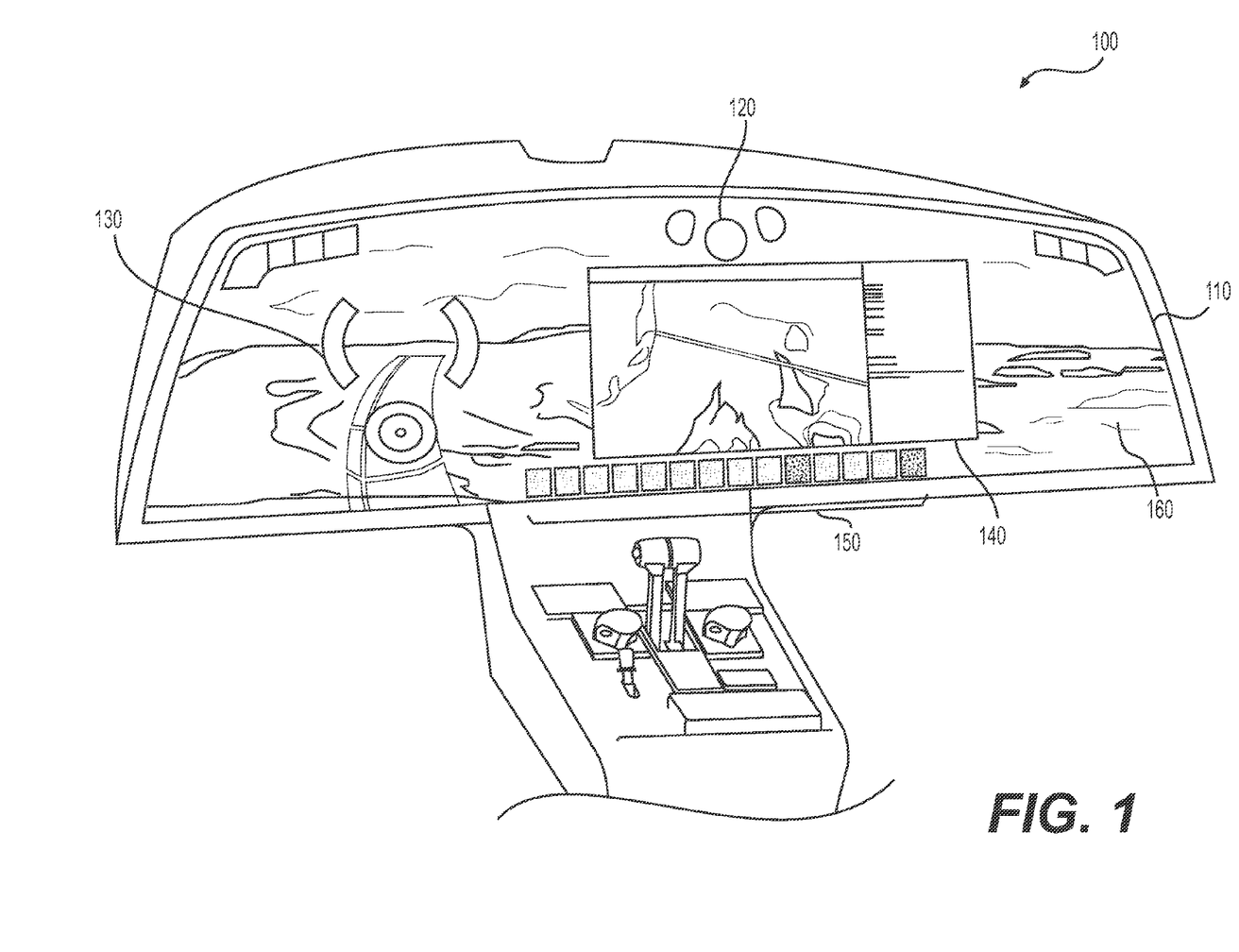
FIG. 1 depicts a perspective view of an embodiment of a touch-screen instrument panel system for an aircraft.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer becomes transparent so that the standby flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users have easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, the user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather informational pop-up. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
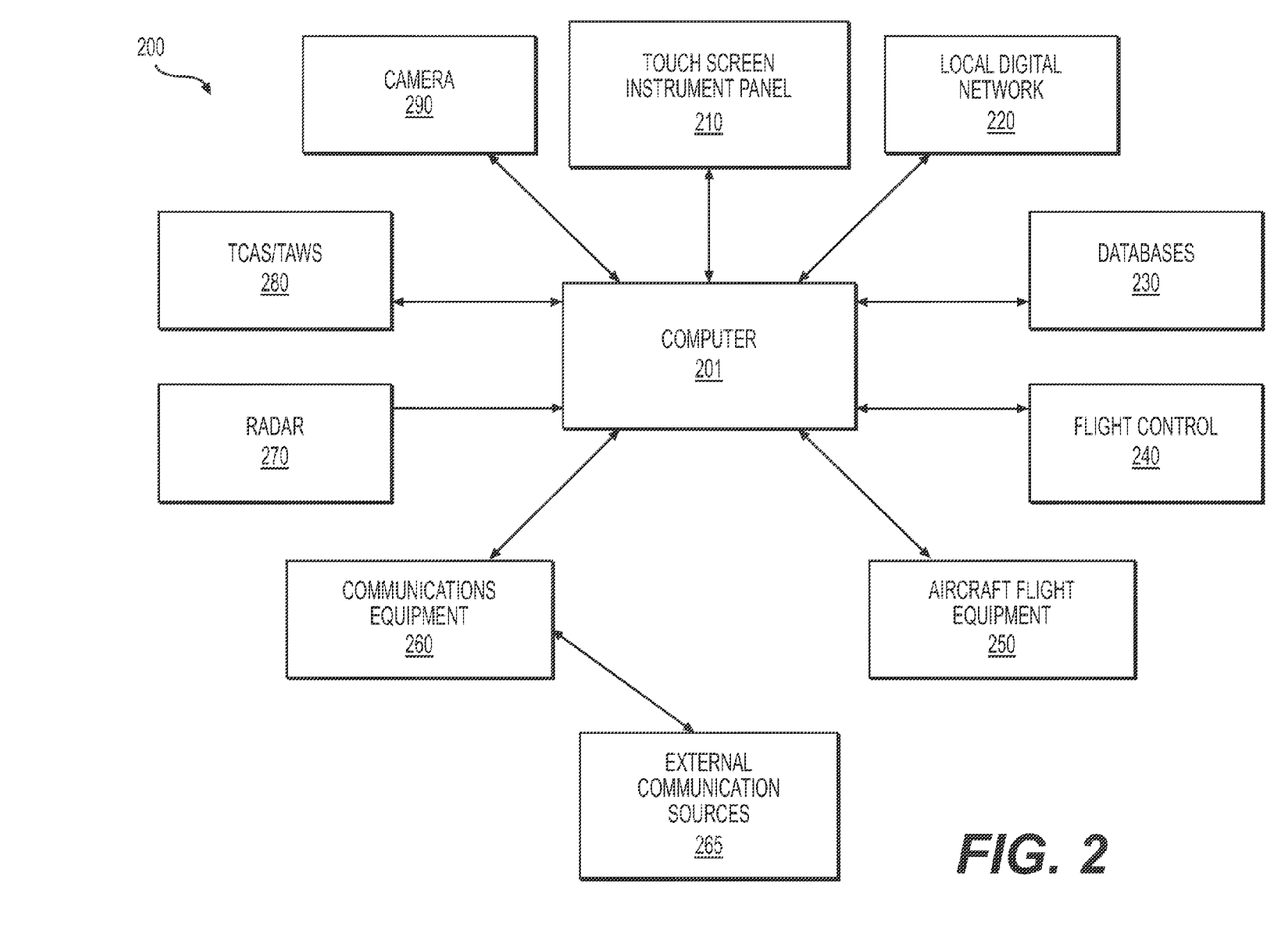
FIG. 2 depicts a system diagram for an embodiment of a touch-screen instrument panel system for an aircraft.

FIG. 2 shows one embodiment of a system environment 200 including an aircraft touch-screen instrument panel 210. System environment 200 has a network of subsystems that includes an on-board computer 201, the touch-screen instrument panel (TSIP) 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processors provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as curves or corners. In an embodiment, the substrate has a large aspect ratio for providing panoramic images. Display is for example an organic light-emitting diode (OLED) display, which is thin and flexible for layering onto substrate. When unpowered, the display is, in some embodiments, transparent. Touch membrane is a thin, transparent and flexible material that is layered onto a display and capable of sensing touch. Touch membrane is for example a resistive, capacitive, optical, or infrared touch screen. Together, touch membrane and display provide TSIP 210 with a visual display that a user may control by touching with one or more fingers or a stylus. Such a touch comprises a touch input to the TSIP 210. In some embodiments, TSIP 210 is a multi-touch display that allows multiple users to touch and interact with the TSIP 210 simultaneously. For example, in some embodiments, both a pilot and a co-pilot may simultaneously touch and interact with TSIP 210 through different windows or controls displayed on TSIP 210.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, anti-icing equipment, lights, and sensors (e.g., temperature, pressure, electrical). Aircraft flight equipment 250 is monitored and controlled by pilots using TSIP 210 through computer 201 for flying the aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the state or condition of the aircraft, meaning that the user interface components provide an intuitive, broad view of the aircraft, its various components and subsystems, and their configuration, condition, and status. The user interface utilizes the touch screen functionality of the TSIP 210 to present views of the aircraft to intuitively communicate information and accept input from the pilot. In some embodiments, the views also include graphical depictions of all or a relevant portion of the aircraft. In some embodiments, the views of the aircraft also incorporate display elements, including without limitation graphical, textual, and numerical elements, in conjunction and associated with graphical depictions of the aircraft to convey the state of the aircraft and to simultaneously convey multiple pieces of information to the pilot or user. The graphical, textual, and numerical elements of the user interface may flash, change color, change content, appear, disappear, move or change location, or otherwise change in response to user input or the state of the aircraft systems. The varying colors, values, or appearances of the display element symbolize or represent the state of the aircraft and its various systems. Some of the display elements may function as input elements such as buttons or text or number entry fields, receiving input from a user through TSIP 210.

The computer 201 monitors the aircraft's data buses to determine the positions, temperatures, pressures, and states of various equipment and systems of the aircraft. The TSIP 210 graphically displays the data gleaned from the buses and stored in computer 201 in the appropriate synoptic panels or windows for flight crew interaction. The inventive user interface provides a thorough, easily understood, intuitive and user-friendly interaction with each synoptic user interface. The touch screen functionality of the TSIP 210 also allows the user to activate aircraft systems and change configuration settings through user interface displayed on the TSIP 210.

The user interface provides for a variety of user interface elements grouped into a variety of "windows", which may also be referred to as "panels" or "pages". Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on the TSIP 210. Various embodiments of the panels that are presented in TSIP 210 are described in relation to FIGS. 3 through 8.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration and status. Active controls may be updated automatically by the system to display the current aircraft configuration and status, but are also capable of interacting with the user via the TSIP 210 to receive pilot input.

The invention described herein provides a flight crew with an easier and more intuitive way to control and monitor flight-control surfaces. Specifically, the invention displays flight-control surfaces on TSIP 210 with a single synoptic window that "pops up" over the real-time view of TSIP 210. Additionally, the invention allows a flight crew to make flight-control surface adjustments through TSIP 210, rather than a controller mounted in a pedestal or other location.

FIGS. 3 through 6 depict exemplary aircraft flight-control systems for displaying aircraft surfaces and receiving selections to control aircraft surfaces via TSIP 210. FIGS. 3 through 6 illustrate an exemplary user interface that may be displayed over the real-time image provided by TSIP 210.

Figure 3:
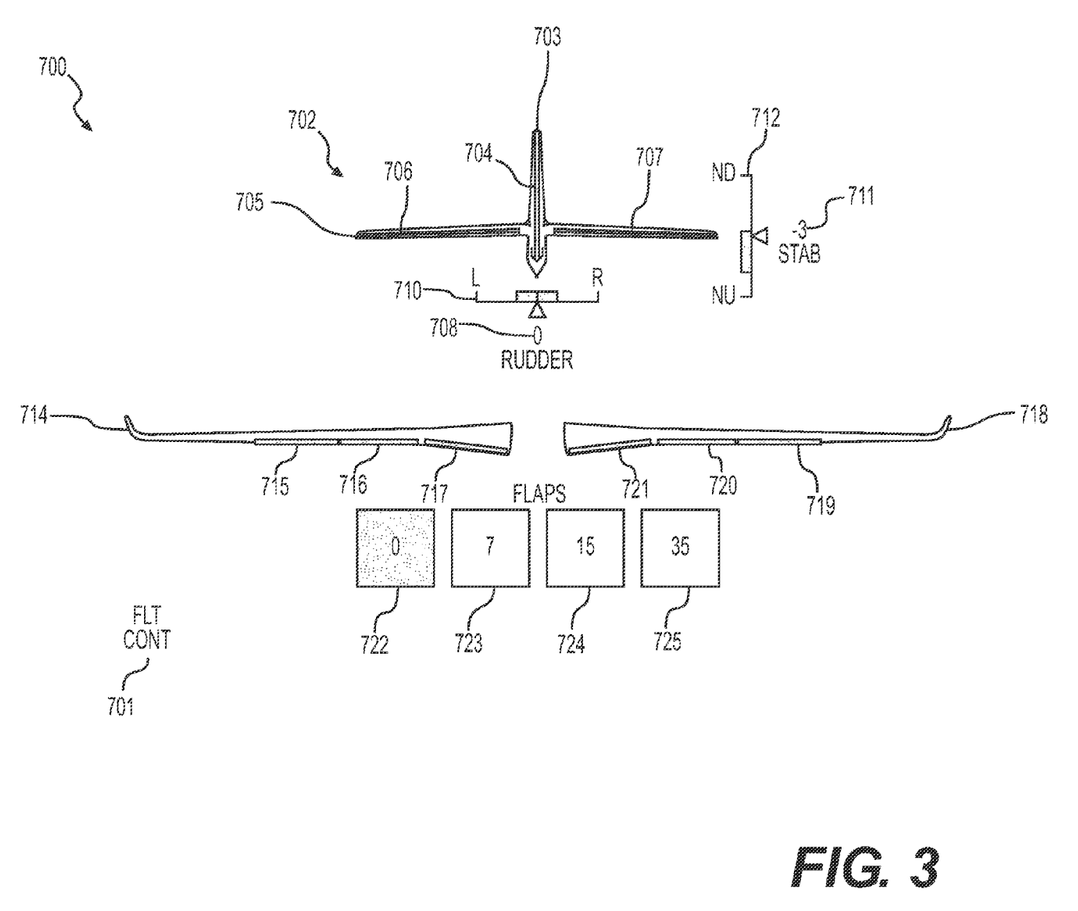
FIG. 3 depicts one embodiment of an aircraft flight-control system for displaying and controlling aircraft surfaces via a touch-screen instrument panel.

FIG. 3 depicts an exemplary aircraft flight-control system 700, which includes an abbreviated title (FLT CONT) 701, and is configured to continuously display numerically and graphically the instantaneous positions of the aircraft's flight-control surfaces via flight-control surface representations. A menu option displayed on TSIP 210, such as FLT CONT menu option 737 of FIG. 7, for example, may be used to select aircraft flight-control system 700.

FIG. 3 depicts flight-control surface representations with silhouette images to represent large flight surfaces. For example, a tail image 702 depicts a silhouette of the aircraft tail with a perspective view from the rear of the aircraft. Tail image 702 may display large flight surfaces including a vertical stabilizer image 703 and a horizontal stabilizer image 705. Smaller flight-control surface representations may be overlaid on the silhouetted images. For example, vertical stabilizer image 703 includes an overlaid representation of a smaller flight-control surface, namely a rudder display 704. Similarly, horizontal stabilizer image 705 may include overlaid representations of smaller flight-control surfaces, such as a left elevator display 706 and a right elevator display 707.

FIG. 3 also includes a left wing image 714 and a right wing image 718, which depict a silhouette of each wing with a perspective view from the rear of the aircraft. Left wing image 714 may include representations of smaller flight-control surfaces, including but not limited to, flaps, ailerons, speed brakes, and slats. Aileron and speed brake graphical indicators are both shown in figures FIGS. 5 and 6. Slats are located on the leading edge of the wing and thus are not shown in the perspective view from the rear provided by FIG. 3. Slats are typically deployed automatically with flaps but may be controlled independently within an embodiment of aircraft flight-control system 700. Left wing image 714 includes a left-wing outboard flap display 715, a left-wing middle flap display 716, and a left-wing inboard flap display 717. Similarly, right wing image 718 includes a right-wing outboard flap display 719, a right-wing middle flap display 720, and a right-wing inboard flap display 721. In FIG. 3, flap displays 715, 716, 717, 719, 720, 721 are configured to indicate that all flaps are located in a fully retracted position.

In addition to aircraft flight-control surface representations, aircraft flight-control system 700 continuously monitors aircraft data busses to determine positions and intended movement of the flight-control surfaces and illustrates instantaneous positions of flight-control surfaces with position indicators via TSIP 210. The aircraft's data busses continuously receive data from sensors configured to determine actual positions of flight-control surfaces. Position indicators may include graphical and numerical indicators. An exemplary graphical indicator is a rudder graphical indicator 710, which indicates the aircraft's rudder position to the left or right of the aircraft's vertical stabilizer. Specifically, FIG. 3 shows an equally balanced rudder graphical indicator 710 to indicate a straight (i.e., unturned) rudder position with respect to the aircraft's vertical stabilizer. Similarly, a horizontal stabilizer graphical indicator 712 may indicate nose-up or nose-down positions of the aircraft's horizontal stabilizer with respect to a nominal position. FIG. 3 shows horizontal stabilizer graphical indicator 712 indicating a nose-up position of the aircraft's horizontal stabilizer. Typically aircraft left and right elevators move simultaneously with each other and independently of the horizontal stabilizer. Accordingly, left and right elevator displays 706, 707 may represent left and right elevator positions simultaneously with each other and independently of horizontal stabilizer image 705.

Many aircraft flight-control surfaces, including rudders, horizontal stabilizers and elevators, typically receive input for control from a control stick and/or rudder pedals. Aircraft flight-control system 700 is configured to continuously display instantaneous positions regardless of how the flight-control surfaces are controlled. In an embodiment, aircraft flight-control system 700 is configured to receive inputs via TSIP 210 to control aircraft flight-control surfaces including rudders, horizontal stabilizers and elevators.

Figure 4:
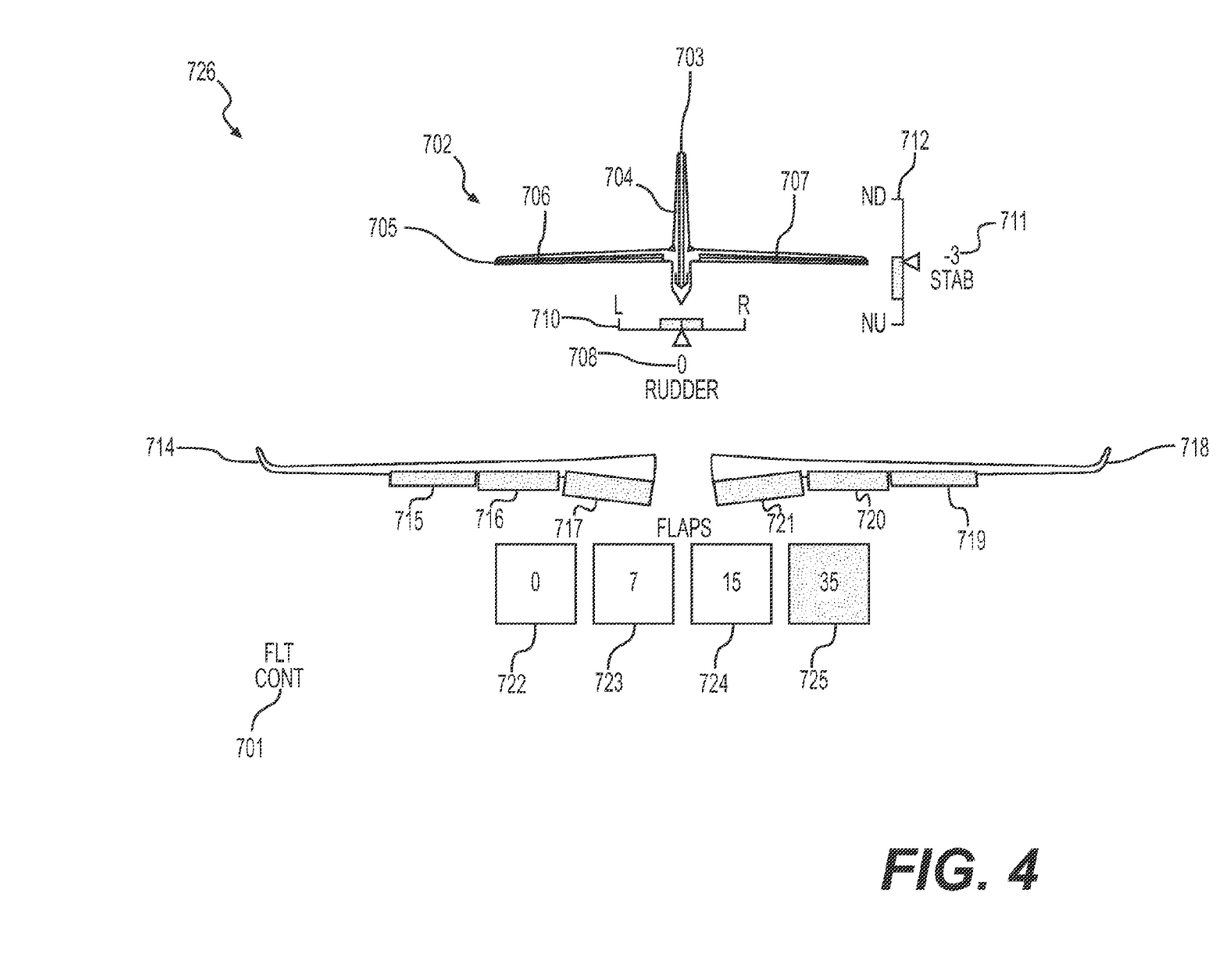
FIG. 4 depicts one embodiment of an aircraft flight-control system for displaying and controlling aircraft surfaces via a touch-screen instrument panel.

FIG. 4 depicts an exemplary aircraft flight-control system 726 for displaying aircraft surfaces and receiving selections to control aircraft surfaces via TSIP 210. Aircraft flight-control system 726 is an example of aircraft flight-control system 700 of FIG. 3. Graphical displays may be integrated within silhouette images. For example, graphical displays for flap positions are overlaid on wing images. Specifically, FIG. 4 shows left wing image 714 and right wing image 715 with flap displays 715, 716, 717, 719, 720, 721 indicating fully deployed flap positions, whereas FIG. 3 shows flap displays 715, 716, 717, 719, 720, 721 for fully retracted flap positions. Note that the flap displays shown in FIG. 4 are larger than the flaps displays shown in FIG. 3 to provide a size perspective and an intuitive representation of flap deployment that may be quickly observed. In an embodiment, flap displays for intermediate flap angles (e.g., seven and fifteen degrees) are correspondingly sized to represent intermediate flap angles. In other words, a view of left wing image 714 and right wing image 718 mimics an actual view of the aircraft's flaps from behind the aircraft.

In addition to graphical indicators, aircraft flight-control system 700 includes numerical indicators to continuously display instantaneous positions of flight-control surfaces. For example, a rudder numerical indicator 708 displays a numeric position in degrees with respect to the aircraft's vertical stabilizer. Specifically, FIGS. 3 through 6 show a zero degree position of rudder numerical indicator 708, indicating that the rudder is straight (i.e., unturned) behind the aircraft's vertical stabilizer. Similarly, a horizontal stabilizer numerical indicator 711 may display a position in degrees from a nominal level position. Specifically, FIGS. 3 through 6 show a minus three degree position of horizontal stabilizer numerical indicator 711 to indicate the aircraft's horizontal stabilizer position is three degrees below nominal. In an embodiment, aircraft flight-control system 700 includes numerical indicators for left and right elevators 706, 707.

Figure 5:
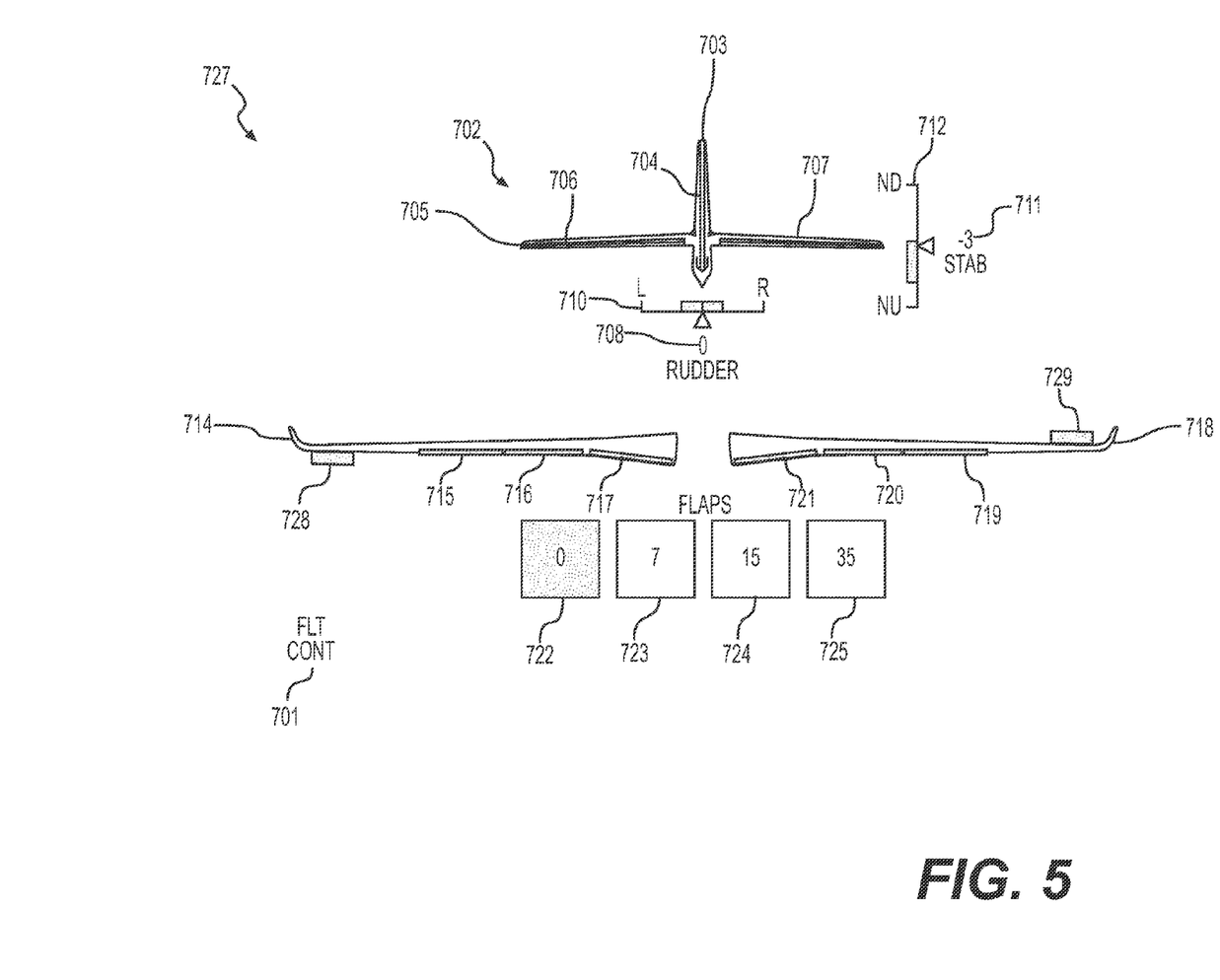
FIG. 5 depicts one embodiment of an aircraft flight-control system for displaying and controlling aircraft surfaces via a touch-screen instrument panel.
Figure 6:
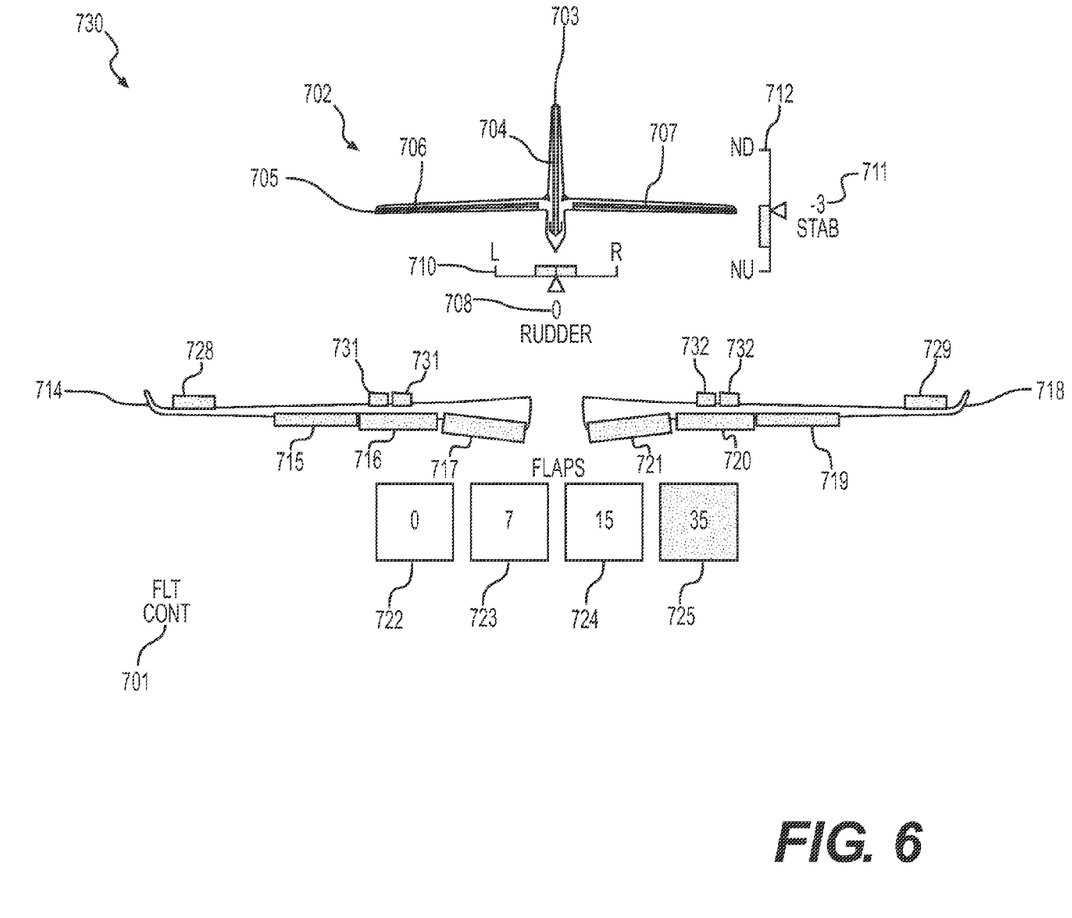
FIG. 6 depicts one embodiment of an aircraft flight-control system for displaying and controlling aircraft surfaces via a touch-screen instrument panel.

In addition to graphical and numerical position indicators used to display aircraft flight-control information, aircraft flight-control system 700 may be configured to receive selections for controlling aircraft surfaces. For example, a series of displayed flap angle options are configured to receive selections of flap angles. FIGS. 3 through 6 show exemplary flap angle options including a zero degree flap option 722, a seven degree flap option 723, a fifteen degree flap option 724, and a thirty-five degree flap option 725. FIGS. 3 and 5 show zero degree flap option 722 highlighted, indicating that selection of a zero degree position was received for fully retracted aircraft flaps. FIGS. 4 and 6 show thirty-five degree flap option 725 highlighted, indicating that selection of a thirty-five degree position was received for fully deployed aircraft flaps.

Controlling flap angles by receiving flap angle selections via TSIP 210 is an improvement over prior art methods that use a monument mounted in the pedestal. An aircraft flap controller is essentially a lever mounted to an electrical resolver, which reads the position of the flap handle lever and converts that position to a digital signal. The signal is interpreted as a command to the flap driver in the wing, which moves the flap surface. Aircraft flight-control system 700 replaces the monument and generates identical digital signals upon receiving selections via TSIP 210. One advantage of using TSIP 210 is to avoid the need for the pedestal, which removes potential for foot strikes on the flap controller.

Aircraft flight-control system 700 displays actual (measured) positions of flight-control surfaces. Thus, if selection is received to deploy the flaps, for example, but one or more flaps does not move, the actual state of each flap is displayed, not the intended position. This provides the flight crew with greater situational awareness in the event of a suspected malfunction with a flight-control surface.

During movement of a flight-control surface, corresponding graphical and numerical indicators may display the actual position accordingly. For example, if the aircraft's rudder moves to the right, rudder graphical indicator 710 indicates a rudder position to the right, and rudder numerical indicator 708 displays a numeric position in degrees, with respect to the aircraft's vertical stabilizer. In an embodiment, rudder display 704 also graphically indicates a rudder position to the right with respect to the aircraft's vertical stabilizer. In another embodiment, rudder display 704 is configured to blink to represent rudder movement.

When a desired position is not reached by a flight-control surface, one or more warning signals may be displayed via the graphical and numerical indicators. For example, if selection is received for thirty-five degree flap option 725 but one or more flaps does not reach thirty-five degrees below nominal (i.e., fully deployed), the corresponding graphical indicator for each faulty flap may be highlighted in a different shade or color. For example, a nominal graphical indicator may be green, whereas a caution is amber and a warning is red. In an embodiment, a warning includes a flashing graphical indicator to attract attention. In another embodiment, noises are made to attract attention to a warning. If a surface that is supposed to work in unison, such as the three flap panels, malfunctions, the system changes the flight-control surface color from green to amber or red. As an example, selection is received to deploy the flaps to thirty-five degrees, but middle flap panel on the right wing deploys to seven degrees, middle flap display 720 would produce a warning signal. Thus the graphical representation of aircraft flight-control system 700 provides the flight crew with a quick visual guide to the state of each flight-control surface for improved situational awareness.

FIG. 5 depicts an exemplary aircraft flight-control system 727 for displaying aircraft surfaces and receiving selections to control aircraft surfaces via TSIP 210. Aircraft flight-control system 727 is an example of aircraft flight-control system 700 of FIG. 3. Aircraft flight-control system 727 includes a left wing aileron display 728 and a right wing aileron display 729. Ailerons are flight-control surfaces used to roll an aircraft for banking while turning. Ailerons are typically activated when a pilot makes an input with a control stick but may be controlled via TSIP 210 as an embodiment of aircraft flight-control system 727. The resulting position of the ailerons may be displayed on TSIP 210 via aircraft flight-control system 727. For example, when a right banking turn has been initiated, the aircraft's left wing aileron drops below the wing and the aircraft's right wing aileron lifts above the wing. Accordingly, aircraft flight-control system 727 displays left wing aileron display 728 below left wing image 714 and right wing aileron display 729 above right wing image 718, as shown in FIG. 5. In certain situations both ailerons of an aircraft may be in a position above the wing for slowing the aircraft without rolling (see for example, FIG. 6).

FIG. 6 depicts an exemplary aircraft flight-control system 730 for displaying aircraft surfaces and receiving selections to control aircraft surfaces via TSIP 210. Speed brakes are flight-control surfaces used to slow an airplane by creating drag. FIG. 6 illustrates exemplary locations of a left wing speed brake display 731 and a right wing speed brake display 732 above middle flap displays 716, 720 on top of left and right wing images 714, 718, respectively. Each aircraft speed brake may include one or more panels. For example, FIG. 6 shows two panels per left and right speed brake display, 731, 732, respectively. Speed brakes are deployed typically during landing but also during flight, by using a lever next to throttles on the pedestal, and aircraft flight-control system 730 is configured to display the resulting speed brake positions. Specifically, FIG. 6 illustrates fully deployed speed brakes with left and right wing speed brake displays 731, 732 shown above left and right wing images 714, 718, respectively. In an embodiment, left and right speed brake displays 731, 732 are configured to receive selections for controlling positions of the aircraft's speed brakes.

Figure 7:
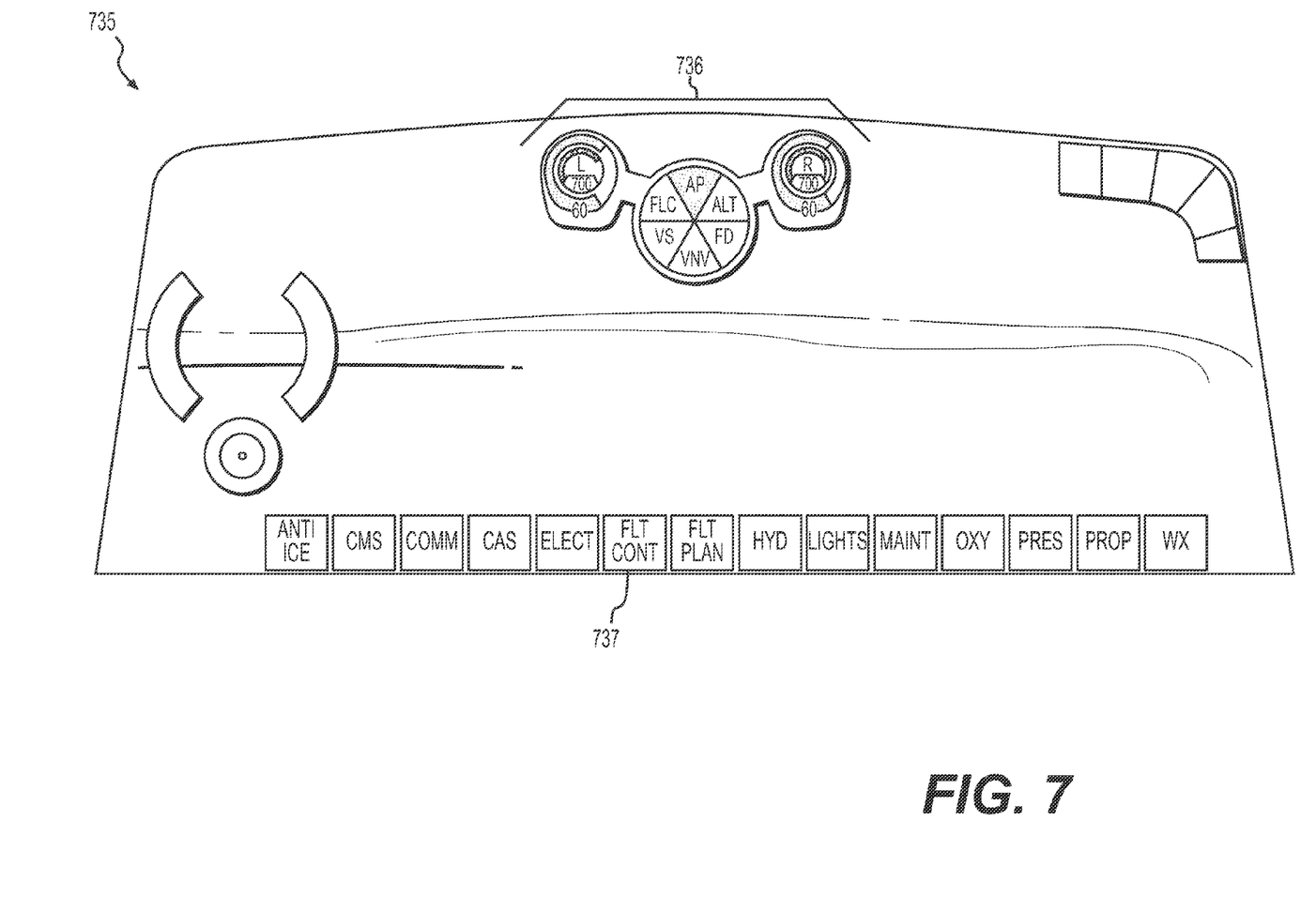
FIG. 7 depicts one embodiment of an aircraft flight-control system for displaying and controlling aircraft engines and autopilot on a touch-screen instrument panel.

FIG. 7 depicts an exemplary TSIP 735, which is an example of TSIP 210 of FIG. 2. FIG. 7 illustrates a combined mode controller and engine indicator 736 located in the upper middle portion of TSIP 735. Combined mode controller and engine indicator 736 displays a mode controller for controlling aircraft autopilot options and for visualizing engine information. In an embodiment, combined mode controller and engine indicator 736 is configured to be displayed in a convenient location between the pilot and co-pilot, as shown in FIG. 7, but it may be displayed in any location on TSIP 210 without departing from the scope hereof. Aircraft flight-control system 700 may be selected from a menu, such as menu 150 of FIG. 1. Specifically, a FLT CONT 737 menu option may be used to select aircraft flight-control system 700, as shown in FIG. 7.

Figure 8:
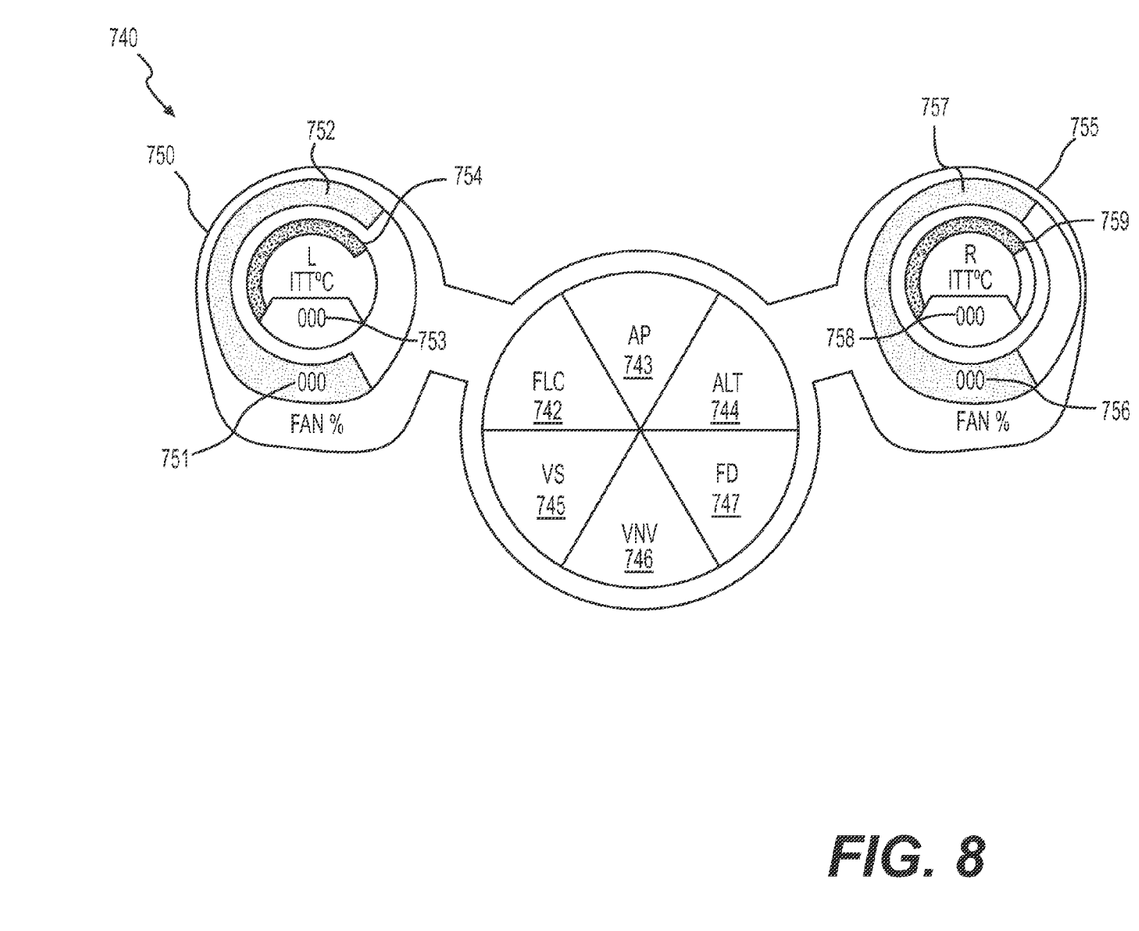
FIG. 8 depicts one embodiment of an aircraft flight-control system for displaying aircraft engine indicators and for displaying and controlling autopilot options via a touch-screen instrument panel.

FIG. 8 depicts a combined mode controller and engine indicator 740, which is an example of combined mode controller and engine indicator 736 of FIG. 7. Combined mode controller and engine indicator 740 is designed to represent the shape of an aircraft's fuselage and engine cowlings, wherein the fuselage portion includes a mode controller 741 and the engine cowlings include a left engine indicator 750 and a right engine indicator 755. Combined mode controller and engine indicator 736 receives data from the aircraft's data busses and processes data using onboard computer 201 to determine left and right engine performance and displays the performance data on TSIP 210.

Mode controller 741 includes options for selection of various autopilot control functions via TSIP 210 including, but not limited to, Flight Level Change (FLC) 742, Autopilot (AP) 743, Altitude (ALT) 744, Vertical Speed (VS) 745, Vertical Navigation (VNV) 746, and Flight Director (FD) 747. Once selection of an autopilot mode is made, the respective portion of mode controller 741 may be highlighted, with a different shade or color for example.

Left engine indicator 750 and a right engine indicator 755 provide the flight crew with a graphical and numerical representation of engine performance and status. FIG. 8 shows an exemplary combined mode controller and engine indicator 740 for a dual-engine aircraft, but combined mode controller and engine indicator 740 could be configured to display engine indicators for a single-engine or triple-engine aircraft, without departing from the scope hereof.

Left engine indicator 750 includes a fan speed numerical display 751 and a fan speed graphical display 752. Similarly, right engine indicator 755 includes a fan speed numerical display 756 and a fan speed graphical display 757. Fan speed numerical displays 751 and 756 include numerical indicators of fan speed, for example, as a percentage of a pre-determined maximum fan speed, corresponding to the aircraft's left and right engine fan speeds, respectively. Fan speed graphical displays 752 and 757 include graphical indicators of fan speed, such as a graphical dial for example, corresponding to fan speed of the aircraft's left and right engines, respectively. Graphical displays 752 and 757 may include various shading or coloring to convey fan speed information. For example, fan speeds less than eighty percent may be colored green, while fan speeds between eighty and eighty-nine percent may be colored amber to indicate caution, and fans speeds of ninety percent or greater may be colored red to provide a warning signal. In an embodiment, fan speed graphical displays 752 and 757 include gradients of shading or coloring between different shades or colors, respectively. In an embodiment, fan speed numerical displays 751 and 756 include coloring or shading that matches fan speed graphical displays 752 and 757, respectively.

Left engine indicator 750 includes an Interstage Turbine Temperature (ITT) numerical display 753 and an ITT graphical display 754. Similarly, right engine indicator 755 includes an ITT numerical display 758 and an ITT graphical display 759. ITT numerical displays 753 and 758 include numerical indicators of temperature, for example in degrees Celsius, corresponding to measured temperature of the aircraft's left and right engines, respectively. ITT graphical displays 754 and 759 include graphical status indicators that change shade or color, for example, corresponding to temperature changes for the aircraft's left and right engines, respectively, and to provide warnings of anomalous performance. In an embodiment, ITT numerical displays 753 and 758 change shade or color to match the shade or color of ITT graphical displays 754 and 759, respectively Each of the numerical and graphical displays for the engine indicators, shown in FIG. 8 and described above, may be configured to receive selections for responding to warning signals. For example, selection of a numerical or graphical display provides a list of options displayed on TSIP 210, which may include standard operating procedures and checklists from databases 230 for alleviating anomalous performance.

Figure 9:
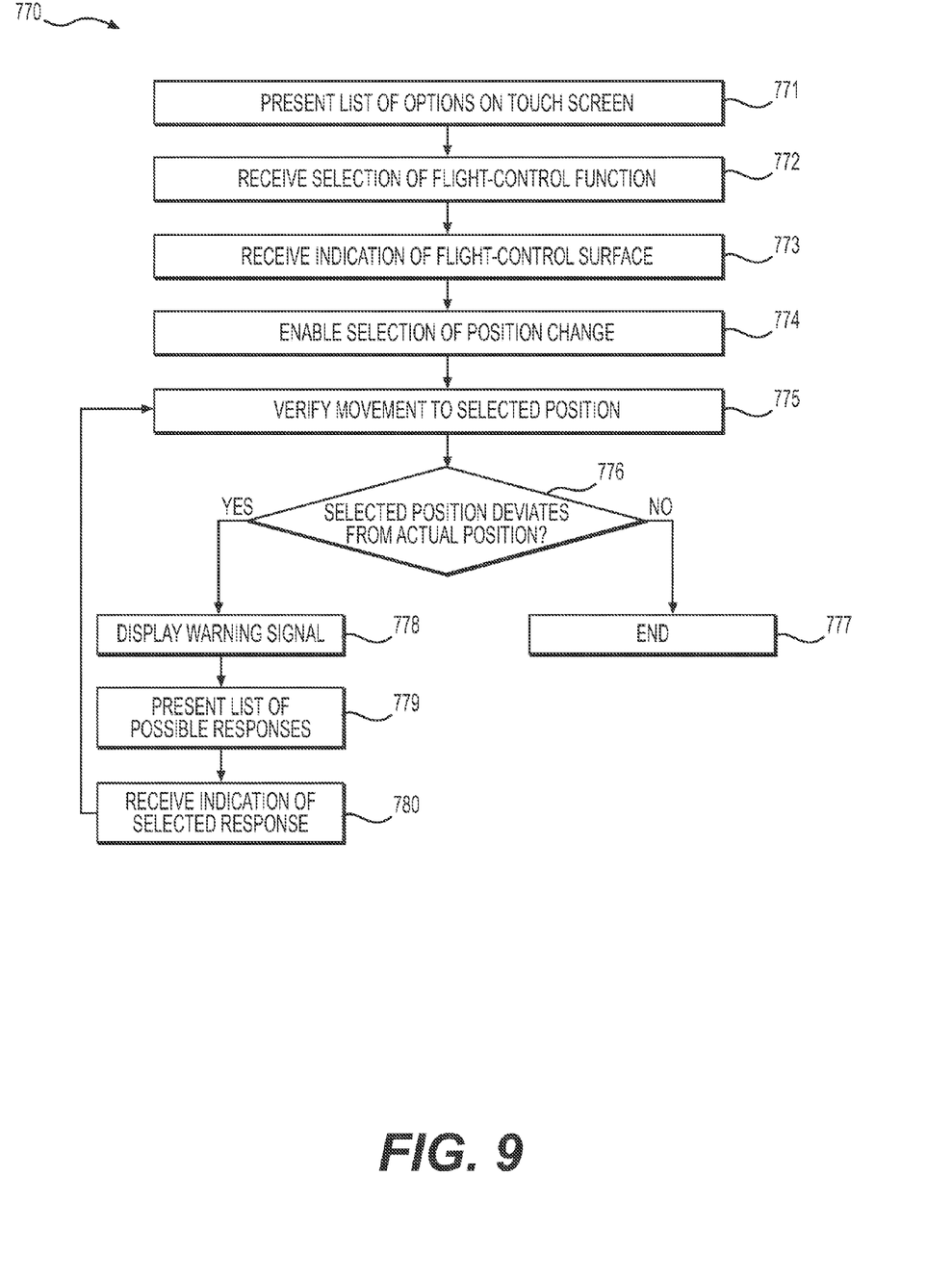
FIG. 9 shows steps of one embodiment of an aircraft flight-control method for displaying and controlling aircraft surfaces via a touch screen instrument panel.

FIG. 9 depicts an exemplary aircraft flight-control method 770 for controlling aircraft flight-control surfaces via TSIP 210. In step 771, a list of menu options is presented. In an example of step 771, a list of menu options, including a flight-control option 737, is presented on TSIP 210, as shown in FIG. 7.

In step 772, a selection of an aircraft flight-control function is received. In an example of step 772, selection of aircraft flight-control system 700 (of FIG. 3) is received via flight-control option 737 of TSIP 210, as shown in FIG. 7.

In step 773, an indication is received to identify a flight-control surface to control. In an example of step 773, an indication is received to control flaps via flap angle options including zero degree flap option 722, seven degree flap option 723, fifteen degree flap option 724, and thirty-five degree flap option 725, as shown in FIGS. 3 through 6. Note that aircraft flight control system 700 may be configured to continuously display instantaneous positions of flight-control surfaces, before, during and after an indication is received to control flight-control surfaces.

In step 774, a selection is enabled to initiate a position change for the selected flight-control surface. In an example of step 774, flap angle options are enabled for selection to change flap positions including zero degree flap option 722, seven degree flap option 723, fifteen degree flap option 724, and thirty-five degree flap option 725, as shown in FIGS. 3 through 6. In an embodiment, zero degree flap option 722 is selected, as shown in FIGS. 3 and 5. In another embodiment, thirty-five degree flap option 725 is selected, as shown in FIGS. 4 and 6.

In step 775, a corresponding movement to a selected position is verified for the aircraft flight-control surface. Example flight-control surfaces include the aircraft's horizontal stabilizer, elevator, rudder, aileron, speed brake, and flap. Movement of flight-control surfaces may be controlled by aircraft flight-control system 700 or by other automatic or pilot initiated controls such as a control stick or rudder pedals. In an example of step 775, following selection of zero degree flap option 722, flap displays 715, 716, 717, 719, 720, 721 are configured to indicate fully retracted flap positions and zero degree flap option 722 is highlighted, as shown in FIGS. 3 and 5. Fully retracted flap positions are measured, for example, by sensorsconfigured to detect each fully retracted flap and send a corresponding signal to TSIP 210 via onboard computer 201. In another example of step 775, following selection of thirty-five degree flap option 725, flap displays 715, 716, 717, 719, 720, 721 are configured to indicate fully deployed flap positions and thirty-five degree flap option 725 is highlighted, as shown in FIGS. 4 and 6. Fully deployed flap positions are measured, for example, by sensorsconfigured to detect each fully deployed flap and send a corresponding signal to TSIP 210 via onboard computer 201. Example sensors include contact switches, magnetic contact switches, resolvers, and non-contact interlock switches.

Step 776 is a decision to determine if the selected position deviates from an actual position. If in step 776, the selected and actual positions are determined to be the same (i.e., they essentially do not deviate from one another), then method 770 proceeds to step 777 to end. In an example of step 776, following selection of thirty-five degree flap option 725, fully deployed flap positions are measured, and method 770 proceeds to step 777 to end. Because aircraft flight-control system 700 is configured to continuously display actual flight-control surface positions, step 776 is both simple and intuitive to perform. For example, aircraft flight-control system 726 instantaneously displays the actual position of fully-deployed flaps by highlighting thirty-five degree flap option 725 and showing flap displays 715, 716, 717, 719, 720, 721 in their fully deployed configuration, as shown in FIG. 4.

If in step 776, the selected and actual positions are determined to deviate from one another (i.e., they are not essentially the same position), then method 770 proceeds to step 778 to display a warning signal to indicate that the selected position deviates from the actual position of the control surface. Step 778 is followed by step 779 to present a list of selections for possible responses to the warning signal. Example responses include silencing an audible warning signal, stopping a warning signal from flashing, resetting a flight-control surface to its nominal position, and repeating selection for a desired position. In step 780, an indication is received of a selected response to the warning signal, after which method 770 returns to step 775 to verify movement of the selected position to the actual position.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

We claim:

1. A flight-control system for navigation of an aircraft, comprising:
   a storage component having one or more instructions stored thereon;
   a touch screen display device;
   a processor coupled to the display device and a memory, the processor configured to execute the one or more instructions stored in the storage component; and
   a manager configured to provide flight-control surface representations via the touch screen display device in an aircraft cockpit, the manager comprising:
      a graphical image of the aircraft for displaying flight-control surface representations; and
      one or more position indicators for indicating one or more positions of the aircraft flight-control surfaces,
      wherein the graphical image and the position indicators are configured to receive indications for controlling positions of the aircraft flight-control surfaces and to continuously display actual aircraft flight-control surface positions via sensor measurements.

2. The system of claim 1, wherein the aircraft flight-control surface includes an elevator and its position indicator indicates a nose-down or nose-up pitch of the elevator.

3. The system of claim 1, wherein the aircraft flight-control surface includes a rudder and its position indicator indicates a left or right angle of the rudder.

4. The system of claim 1, further comprising:
   a graphical representation of aircraft wings for displaying wing flight-control surfaces; and
   a second set of position indicators for indicating positions of the wing flight-control surfaces,
   wherein the wing graphical representation and the second set of position indicators are configured to receive indications for controlling positions of the wing flight-control surfaces and to continuously display actual wing flight-control surface positions via sensor measurements.

5. The system of claim 4, wherein the wing flight-control surface includes one or more ailerons and their respective position indicators indicate an up or down angle of the one or more ailerons.

6. The system of claim 4, wherein the wing flight-control surface includes flaps and their respective position indicators indicate flap angles.

7. The system of claim 1, wherein the position indicators include numerical and graphical indicators.

8. The system of claim 1, further comprising one or more warning signals displayed by the graphical representation and position indicators.

9. The system of claim 8, wherein the graphical representation and position indicators are configured to receive selections of options for responding to the one or more warning signals.

10. A flight-control system for navigation of an aircraft, comprising:
a storage component having one or more instructions stored thereon;
a touch screen display device;
a processor coupled to the display device and a memory, the processor configured to execute the one or more instructions stored in the storage component; and
a manager configured to provide autopilot controls and engine indicators via the touch screen display device in an aircraft cockpit, the manager comprising:
a cross-sectional representation of the aircraft fuselage for displaying a mode controller, wherein the mode controller is configured to display autopilot modes and to receive autopilot mode selections; and
the cross-sectional representation further including one or more engine cowls attached to the fuselage for continuously displaying performance indicators for the one or more engines.

11. The system of claim 10, wherein the mode controller includes display options for receiving selections of autopilot, altitude, flight director, vertical navigation, vertical speed, and flight level change.

12. The system of claim 10, wherein the cross-sectional representation of the aircraft fuselage with one or more engine cowls is located near a middle of the touch-screen instrument panel for receiving selections from either a pilot or a co-pilot.

13. The system of claim 10, wherein the performance indicators include interstage turbine temperature for each of the one or more engines.

14. The system of claim 10, wherein the performance indicators include fan speed for each of the one or more engines.

15. The system of claim 10, wherein the indicators of engine performance display warnings of anomalous performance.

16. The system of claim 15, wherein the indicators of engine performance are configured to receive selections of options for alleviating the anomalous performance.

17. A method for controlling an aircraft flight-control surface via a touch screen device comprising:
presenting a list of menu options on a touch screen mounted in an aircraft cockpit, said list including a flight-control function;
receiving a selection of the flight-control function;
upon selection of the flight-control function, receiving an indication of a flight-control surface to control;
upon identifying the flight-control surface, enabling selection of a position change; and
based on the position change selection, verifying a corresponding movement of the flight-control surface to the selected position.

18. The method of claim 17, wherein the flight-control surface identified is one of a horizontal stabilizer, an elevator, a rudder, an aileron, a speed brake, a slat, or a flap.

19. The method of claim 17, further comprising displaying a warning signal to indicate if the selected position of the control surface deviates from the actual position of the control surface.

20. The method of claim 19, wherein the displayed warning signal presents a list of possible responses to the warning signal and receives an indication of a selected response to the warning signal.

* * * * *